US008026973B2

(12) United States Patent
Onoda

(10) Patent No.: US 8,026,973 B2
(45) Date of Patent: Sep. 27, 2011

(54) IMAGING APPARATUS, IMAGING METHOD AND STORAGE MEDIUM

(75) Inventor: Takashi Onoda, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 57 days.

(21) Appl. No.: 12/700,916

(22) Filed: Feb. 5, 2010

(65) Prior Publication Data

US 2010/0201835 A1   Aug. 12, 2010

(30) Foreign Application Priority Data

Feb. 9, 2009   (JP) .................................. 2009-026958

(51) Int. Cl.
*G03B 13/00*   (2006.01)
*G03B 17/00*   (2006.01)
*H04N 5/232*   (2006.01)

(52) U.S. Cl. ........ 348/345; 348/349; 348/353; 348/354; 348/356; 396/79; 396/80; 396/81; 396/89; 396/102

(58) Field of Classification Search .......... 348/345–356; 396/79, 80, 81, 82, 89, 93, 102, 103, 104, 396/121–127, 133
See application file for complete search history.

(56) References Cited

U.S. PATENT DOCUMENTS

| | | | | |
|---|---|---|---|---|
| 5,117,251 A | * | 5/1992 | Ishimura et al. | 396/129 |
| 5,187,515 A | * | 2/1993 | Ishibashi et al. | 396/95 |
| 5,434,638 A | * | 7/1995 | Ishibashi et al. | 396/95 |
| 5,930,532 A | * | 7/1999 | Matsumoto | 396/95 |
| 2008/0317453 A1 | * | 12/2008 | Yuyama | 396/104 |

FOREIGN PATENT DOCUMENTS

| | | |
|---|---|---|
| JP | 4-199113 A | 7/1992 |
| JP | 4-256914 A | 9/1992 |
| JP | 10-3110 A | 1/1998 |
| JP | 11-136557 A | 5/1999 |
| JP | 2001-8135 A | 1/2001 |
| JP | 2002-148693 A | 5/2002 |
| JP | 2004-135029 A | 4/2004 |
| JP | 2007-206433 A | 8/2007 |
| JP | 2008-52225 A | 3/2008 |

OTHER PUBLICATIONS

Japanese Office Action dated Sep. 14, 2010 (and English translation thereof) in counterpart Japanese Application No. 2009-026958.

\* cited by examiner

*Primary Examiner* — Sinh Tran
*Assistant Examiner* — Selam Gebriel
(74) *Attorney, Agent, or Firm* — Holtz, Holtz, Goodman & Chick, PC

(57) ABSTRACT

An imaging apparatus comprises a focusing unit configured to focus an object to be shot by an imaging unit, a first shooting control unit configured to control the imaging unit in order to continuously shooting at first time intervals upon detecting a shooting instruction, a determining unit configured to determine whether the object moves in a distance direction during a control operation of the first shooting control unit, and a second shooting control unit configured to control the imaging unit in order to continuously shoot at second time intervals and to control the focusing unit in order to focus the object when the determining unit determines that the object moves in the distance direction.

2 Claims, 6 Drawing Sheets

IMAGING APPARATUS, IMAGING METHOD AND STORAGE MEDIUM

CROSS-REFERENCE TO RELATED APPLICATIONS

This application is based upon and claims the benefit of priority from prior Japanese Patent Application No. 2009-026958, filed Feb. 9, 2009, the entire contents of which are incorporated herein by reference.

BACKGROUND OF THE INVENTION

1. Field of the Invention

This invention relates to an imaging apparatus having a continuous shooting function, an imaging method and a storage medium.

2. Description of the Related Art

Conventionally, as is known by referring to Jpn. Pat. Appln. KOKAI Publication No. 2002-148693, a camera that variably controls the continuous shooting speed according to an operation force or operation amount of a release operation member by the user is provided.

According to the above camera, the user can set a desired continuous shooting speed and continuous shots.

However, with the above technique, it is difficult for the user to grasp the continuous shooting speed (number of shooting operations per unit time) to be set in order to meet the movement of a subject.

BRIEF SUMMARY OF THE INVENTION

The present invention is directed to determine the continuous shooting speed for meeting the movement of a subject.

According to an embodiment of the present invention, an imaging apparatus comprises an imaging unit; a focusing unit configured to focus an object to be shot by the imaging unit; a first shooting control unit configured to control the imaging unit in order to continuously shoot at first time intervals upon detecting a shooting instruction; a determining unit configured to determine whether the object moves in a distance direction during a control operation of the first shooting control unit; and a second shooting control unit configured to control the imaging unit in order to continuously shoot at second time intervals and to control the focusing unit in order to focus the object when the determining unit determines that the object moves in the distance direction.

According to another embodiment of the present invention, an imaging method comprises focusing an object to be shot by the imaging unit; a first shooting control step of controlling the imaging unit in order to continuously shoot at first time intervals upon detecting a shooting instruction; determining whether the object moves in a distance direction during a control operation of the first shooting control step; and a second shooting control step of continuously shooting at second time intervals and of focusing the object when it is determined that the object moves in the distance direction.

According to another embodiment of the present invention, a storage medium having stored thereon a computer program which is executable by a computer in an imaging apparatus, the computer program controls the computer to execute functions of: focusing an object to be shot by the imaging unit; a first shooting control step of controlling the imaging unit in order to continuously shoot at first time intervals upon detecting a shooting instruction; determining whether the object moves in a distance direction during a control operation of the first shooting control step; and a second shooting control step of continuously shooting at second time intervals and of focusing the object when it is determined that the object moves in the distance direction.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention.

DETAILED DESCRIPTION OF THE INVENTION

An embodiment of an imaging apparatus according to the present invention will now be described with reference to the accompanying drawings.

Figure 1A:
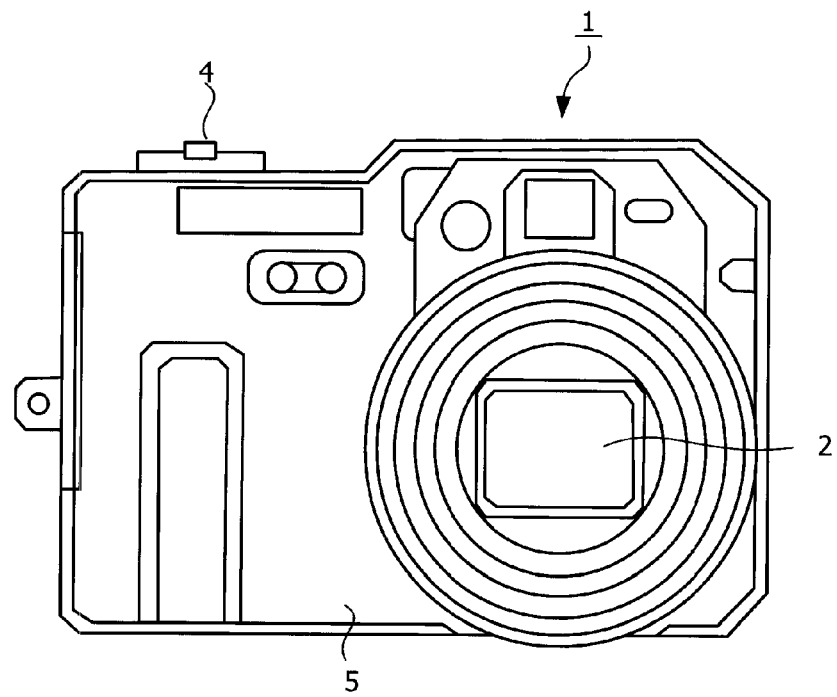
FIG. 1A is a front view of a digital camera according to a first embodiment of this invention.
Figure 1B:
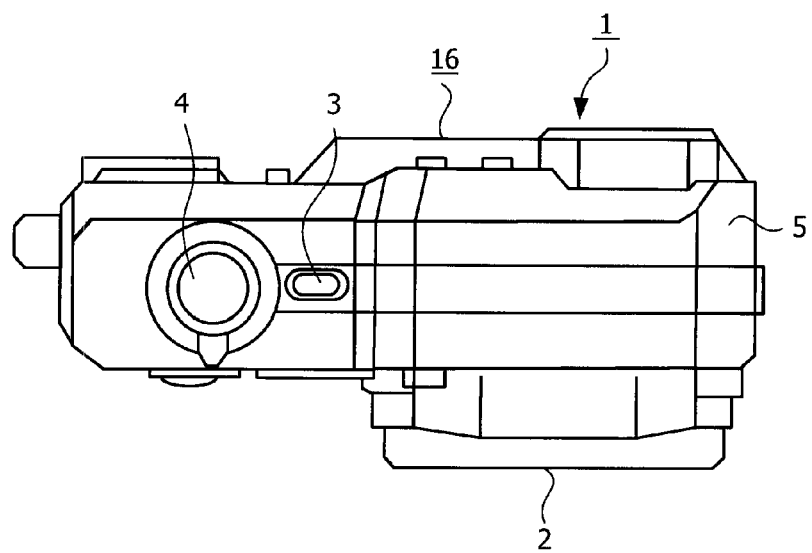
FIG. 1B is a top view of the digital camera according to the first embodiment of this invention.

FIGS. 1A and 1B are front and top views of a digital camera 1 according to this embodiment. As shown in FIG. 1A, an imaging lens 2 is provided on the front surface of a body 5 of the digital camera 1. As shown in FIG. 1B, a power ON/OFF key 3 and shutter button 4 are provided. The shutter button 4 has a so-called half-shutter function and can be half-pressed and fully pressed. Although not shown in FIGS. 1A and 1B, a display device 16 (FIG. 2) formed of an LCD, a mode setting key used to selectively set a shooting mode and playback mode and a still image shooting mode and continuous shooting mode in the shooting mode and the like are provided on the back surface of the body 5.

Figure 2:
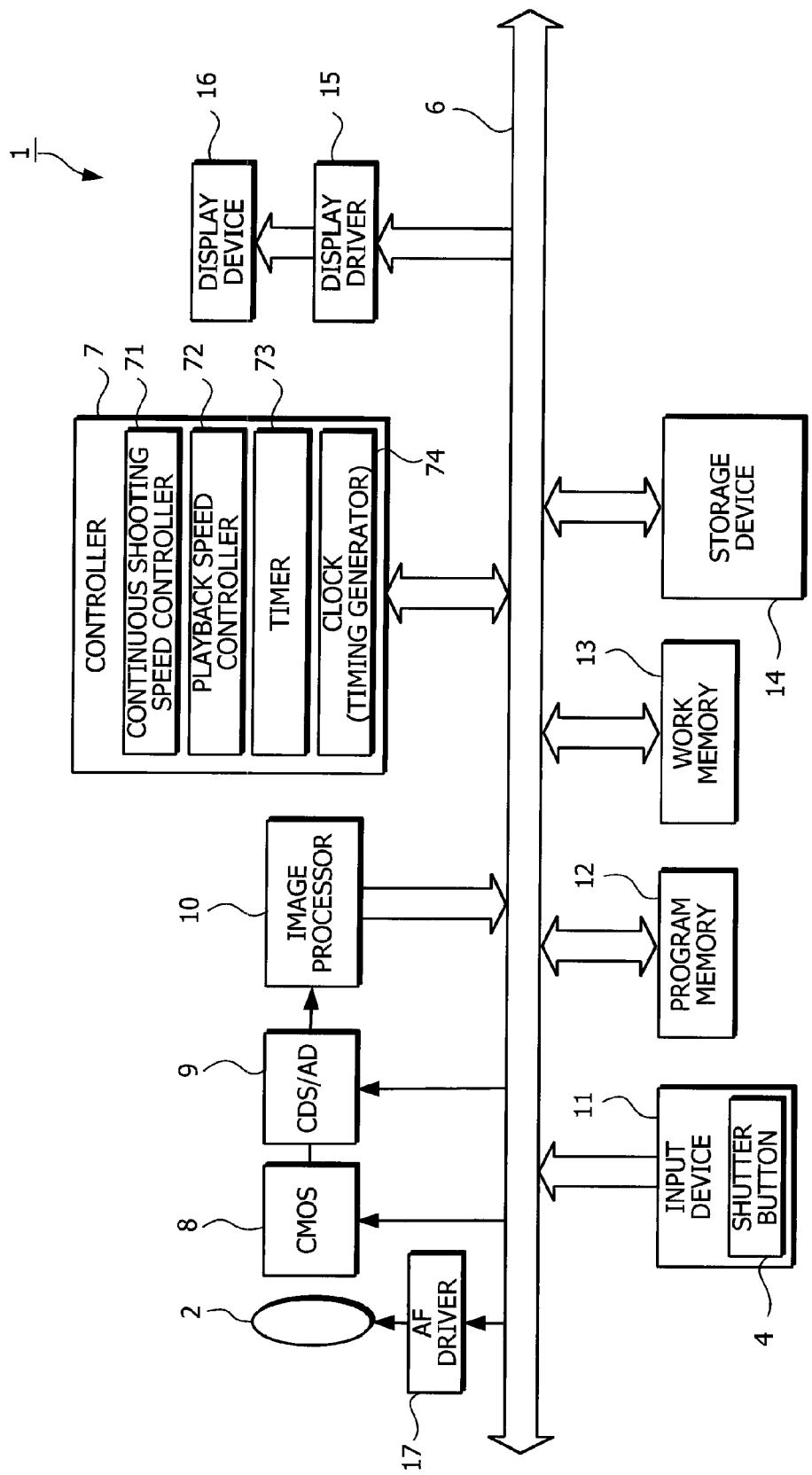
FIG. 2 is a block diagram of the digital camera.

FIG. 2 is a block diagram showing the schematic configuration of the digital camera 1. The digital camera 1 has automatic exposure (AE) and automatic focusing (AF) functions and includes a controller 7 connected to respective portions via a bus line 6.

The controller 7 is a one-chip microcomputer that controls the respective portions of the digital camera 1 and comprises a continuous shooting speed controller 71, playback speed controller 72, timer 73 and clock 74.

The continuous shooting speed controller 71 variably controls the time interval at the shot image recording time in the continuous shooting mode and the playback speed controller 72 variably controls the playback speed at the playback time.

The timer 73 is used when the shooting and recording time is measured in the continuous shooting mode. The clock 74 is a timing generator.

A CMOS 8 is an imaging device and is arranged on the optical axis of the imaging lens 2 formed of a focus lens, zoom lens and the like. The CMOS 8 is controlled by the timer 73.

A unit circuit 9 is a circuit that is supplied with an analog imaging signal corresponding to an optical image of a subject output from the CMOS 8. The unit circuit 9 comprises a correlation double sampling (CDS) circuit that holds an input imaging signal, an automatic gain control (AGC) amplifier that amplifies the imaging signal, an analog-to-digital converter that digitizes the amplified imaging signal, and the like.

An output signal of the CMOS 8 is supplied to an image processor 10 as a digital signal via the unit circuit 9 and is subjected to various image processes.

Further, an input device 11, program memory 12, work memory 13, storage device 14, display driver 15 and AF driver 17 are connected to the bus line 6.

The display driver 15 drives the display device 16 arranged on the back surface of the digital camera 1. The input device 11 includes the shutter button 4 and the like and outputs a key-input signal generated according to the operation by the user to the controller 7. The program memory 12 stores an operation program of the controller 7 and various data items used to control the respective portions and also stores an AF control program used to drive the focus lens and perform the autofocus (AF) control operation.

The work memory 13 is a buffer that temporarily stores image data of a subject photographed by the CMOS 8 and then converted into a digital form and is also used as a working memory of the controller 7.

The image data temporarily stored in the work memory 13 is compressed (coded) by the controller 7, finally attached with a file name (file name using shot date and time) as a plurality of still image data items of a preset format (JPEG form or the like) or moving image data (motion JPEG form, MPEG-4 form, MPEG-4 AVC form or the like) containing a plurality of still image data items and stored in the storage device 14.

The AF driver 17 drives the focus lens in the imaging lens 2 configured by the focus lens, zoom lens and the like according to the control operation by the controller 7 based on the AF control program.

That is, the digital camera 1 displays a focus frame on a live view image on the display device 16, uses image data in the focus frame as a contrast evaluation value acquisition region (AF evaluation region), performs the AF control (AF processing) operation to drive the AF driver 17 so as to focus the image.

Further, the digital camera has a function of performing the exposure measurement process and exposure adjustment process (AE process) based on detected image data to perform an AE control operation based on luminance information contained in the imaging signal in a predetermined region. Also, the digital camera has a function of performing the white balance adjusting process in a detected face region to adjust the white balance so as to adequately record an image.

In each embodiment, it is supposed that the continuous shooting speed S1 (first time interval) is set to "20 frames/sec" and the continuous shooting speed S2 (second time interval) is set to "10 frames/sec".

First Embodiment

Next, the operation of the digital camera 1 with the above configuration is explained. When the power ON/OFF key 3 is operated to an ON position and the input device 11 is operated to set the continuous shooting mode, the controller 7 performs the process according to the procedure shown by the flowchart of FIG. 3 based on the program stored in the program memory 12.

That is, the controller performs the live view display process and causes the display device 16 to display images sequentially fetched by the CMOS 8 (step S101).

It is determined whether the operation of the shutter button 4 is detected in the live view display processing state (step S102).

Then, if the operation of the shutter button 4 is detected, it is determined whether the operation is a half-shutter (half-pressed) operation or not (step S103).

If the half-shutter operation is not detected, the controller determines that a full-shutter (full-press) operation is performed and performs a process of step S106 that will be described later.

If the half-shutter operation is detected, the AF process and AE process are performed and a process for determining the movement of a subject is performed (step S104).

At the time of the subject movement determining process, a subject (to-be-recognized object) in the focus frame is first recognized.

After this, the controller 7 determines the movement of the subject by calculating a motion vector of the recognized subject based on images sequentially fetched by the CMOS 8 or detecting a variation in the size of the recognized subject.

Next, the controller 7 determines whether the full-shutter operation is detected or not (step S105) and repeatedly performs the process from step S104 until the full-shutter operation is detected. The full-shutter operation is an operation indicating the intention of the user to start the continuous shooting operation.

When detecting the full-shutter operation, the controller 7 determines whether or not the movement of the subject determined in step S104 is made in a distance direction with respect to the digital camera 1 (step S106).

If the movement of the subject is not made in the distance direction (when the subject stands still or the subject moves in a right, left, upward or downward direction), the controller 7 performs the focus-lock and exposure-lock processes (step S107).

That is, the AF driver 17 is stopped to fixedly set the focus lens in the current position and the AE process is stopped to fixedly keep the present exposure state.

Further, the controller 7 performs the continuous shooting process after setting the continuous shooting speed S1, acquires still images at 20 (frames/sec) that is the continuous shooting speed S1 from the imaging device formed of the CMOS 8, unit circuit 9, image processor 10 and the like and sequentially records the still images into the work memory 13 (step S108).

Next, the controller 7 determines whether the full-press operation of the shutter button 4 is released or not (step S109). If the full-shutter operation of the shutter button 4 is not released, the process returns to step S106.

Therefore, when the full-shutter operation of the shutter button 4 is continuously performed in a state in which the movement of the subject is not made in the distance direction, (1) a focus-lock continuous shooting process of steps S108 and S109 is performed.

Figure 4:
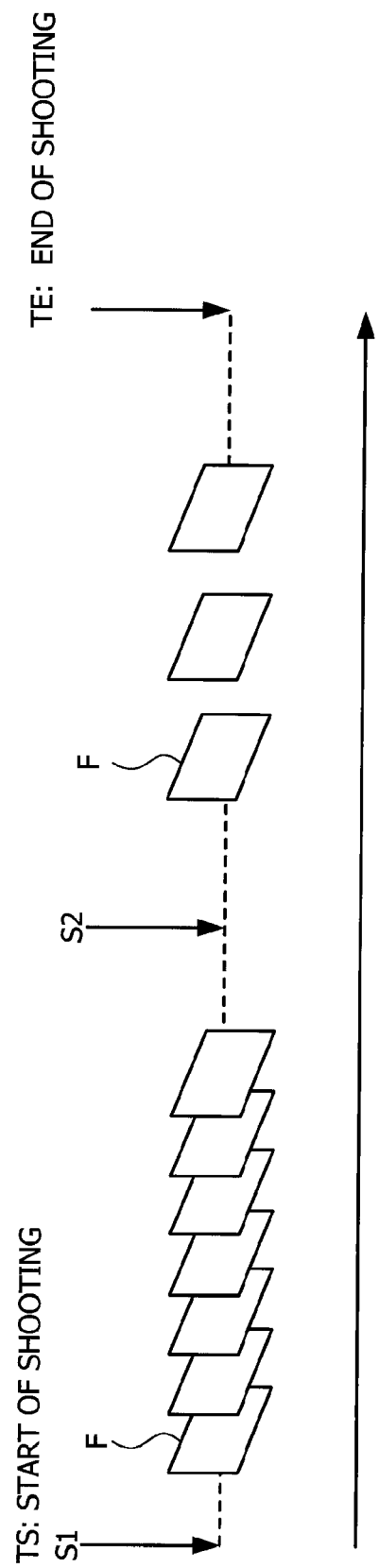
FIG. 4 is a transition diagram showing a form of variation in frame rates in the above embodiment.

As a result, still images F can be sequentially recorded into the work memory 13 with the number of shot images per unit time at the continuous shooting speed S1 from a shooting start time point TS at which the full-shutter operation is detected as shown in FIG. 4 by the focus-lock continuous shooting process (1).

If the subject moves in the distance direction in this state, that is, in a state in which the loop of steps S106, S107, S108, S109, and S106 is repeated, the controller 7 detects the movement of the subject, the determination result of step S106 becomes YES and (2) a focusing operation follow-up continuous shooting process is performed.

The focusing operation follow-up continuous shooting process (2) is a process of continuously performing the continuous shooting process (step S110), determining whether release of the full-shutter operation is detected or not (step S111), performing the focus follow-up process and AE process (step S112) if the above operation is not released, changing the continuous shooting speed from S1 to S2 (step S113) and continuously performing the shooting process (S110). That is, the process is a loop process of steps S110, S111, S112, S113, and S110.

In order to focus the subject who has moved in the distance direction by the focus follow-up process in step S112, the controller 7 controls the AF driver 17 to drive the focus lens and adjusts the exposure based on luminance information contained in the imaging signal of the focused subject by the AE process.

Then, while performing the focus follow-up process and AE process, the controller 7 acquires still images at 10 (frames/sec) that is the continuous shooting speed S2 from the imaging device formed of the CMOS 8, unit circuit 9, image processor 10 and the like and sequentially records the still images into the work memory 13 (step S110).

Thus, in this state, as shown in FIG. 4, still images F are sequentially recorded into the work memory 13 with the number of shot images per unit time at the continuous shooting speed S2.

Then, if the release of the full-shutter operation is detected so as to permit the user to stop the continuous shooting operation, the determination result in step S111 becomes YES and the controller 7 advances the process to step S114 to perform a post-picture-taking process. In the post shooting process (step S114), a plurality of still images F recorded in the work memory 13 are coded, converted into a file form, attached with a file name and stored in the storage device 14.

Therefore, for example, when the subject who stands still moves in a distance direction during the continuous shooting operation, as shown in FIG. 4, images successively photographed at the continuous shooting speed S1 from the shooting start time point TS and continuously shot at the continuous shooting speed S2 in the course of shooting to a shooting end time point TE are converted into a file form and stored.

Further, since the focus follow-up process and AE process are performed in step S112, the continuous shooting operation can be performed with the subject focused and the adequate exposure maintained.

Thus, since it is not required to change the focus adjustment if the movement direction of the subject is not a distance direction, the focus-lock operation is performed and the continuous shooting operation can be performed at a relatively high speed. Therefore, the continuous shooting speed is set to S1 (20 frames/sec). On the other hand, since it is required to perform the autofocus process if the movement direction of the subject is a distance direction, it is required to perform the continuous shooting operation at a relatively low speed. Therefore, the successive picture-taking speed is set to S2 (10 frames/sec).

As a result, it becomes possible to record images that are photographed with adequate exposure at an adequate continuous shooting speed properly set according to the movement direction of the subject while the subject is focused.

If the user releases the full-shutter operation in a state in which the loop of steps S106, S107, S108, S109, and S106 is repeated and (1) the focus-lock successive picture-taking process is performed, the determination result in step S111 becomes YES and the process proceeds to step S114.

Therefore, in this case, still images photographed at the continuous shooting speed S1 from the shooting start time point TS at which the full-shutter operation of the shutter button 4 shown in FIG. 4 is detected are converted into a file form and stored in the storage device 14.

Other embodiments of the imaging apparatus according to the present invention will be described. The same portions as those of the first embodiment will be indicated in the same reference numerals and their detailed description will be omitted.

Second Embodiment

Figure 5:
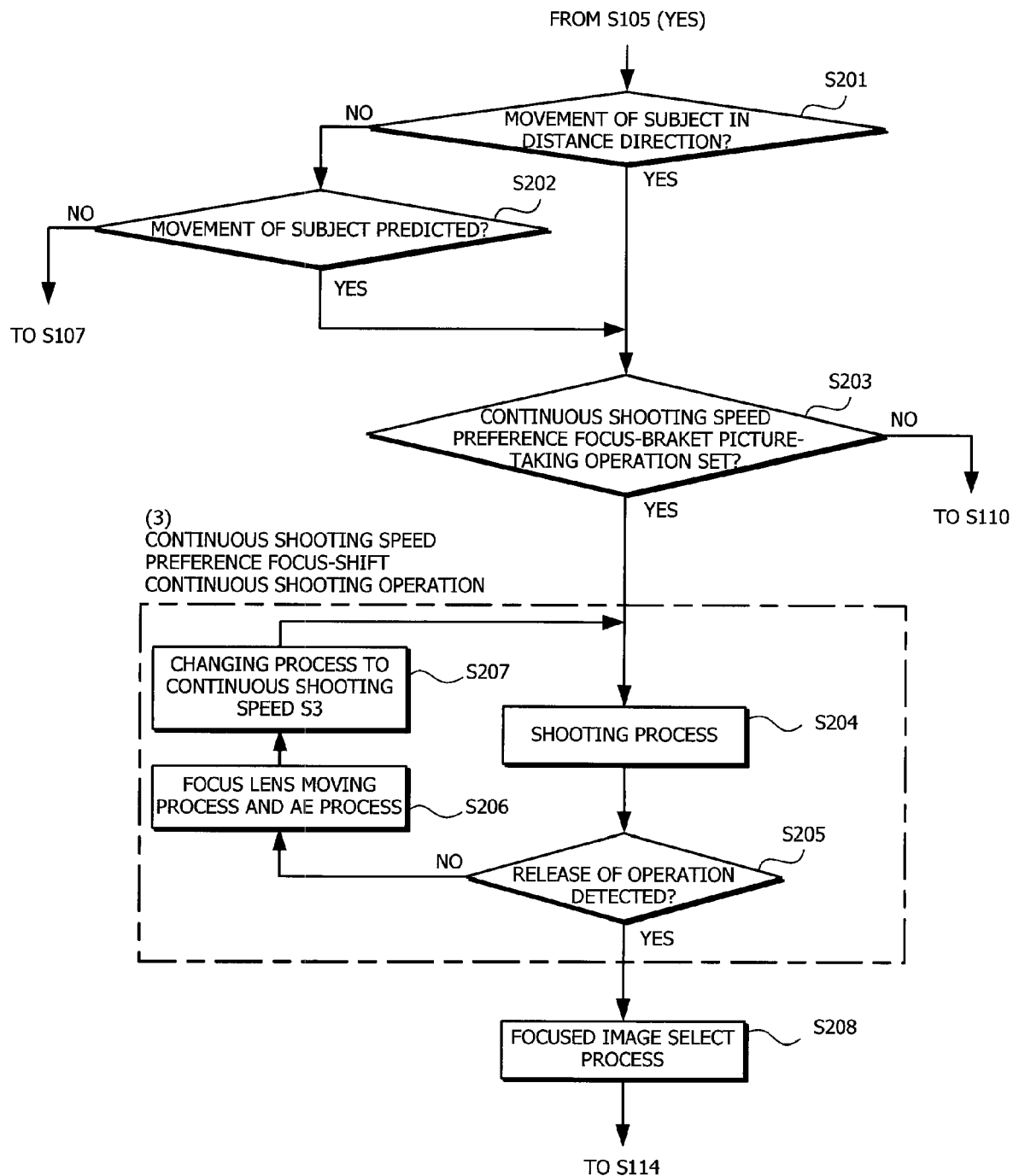
FIG. 5 is a flowchart for illustrating the processing procedure in a second embodiment of this invention.

FIG. 5 is a flowchart for illustrating the processing procedure in a second embodiment of this invention.

First, if it is determined in step S105 that the full-shutter operation is detected in the first embodiment, it is determined whether or not the movement direction of the subject determined in step S104 is a distance direction with respect to the shooting direction (step S201).

If the movement of the subject is not made in the distance direction (when the subject stands still or the subject moves in a right, left, upward or downward direction), it is determined whether a mode in which the movement of the subject is predicted is previously set or not (step S202).

Figure 3:
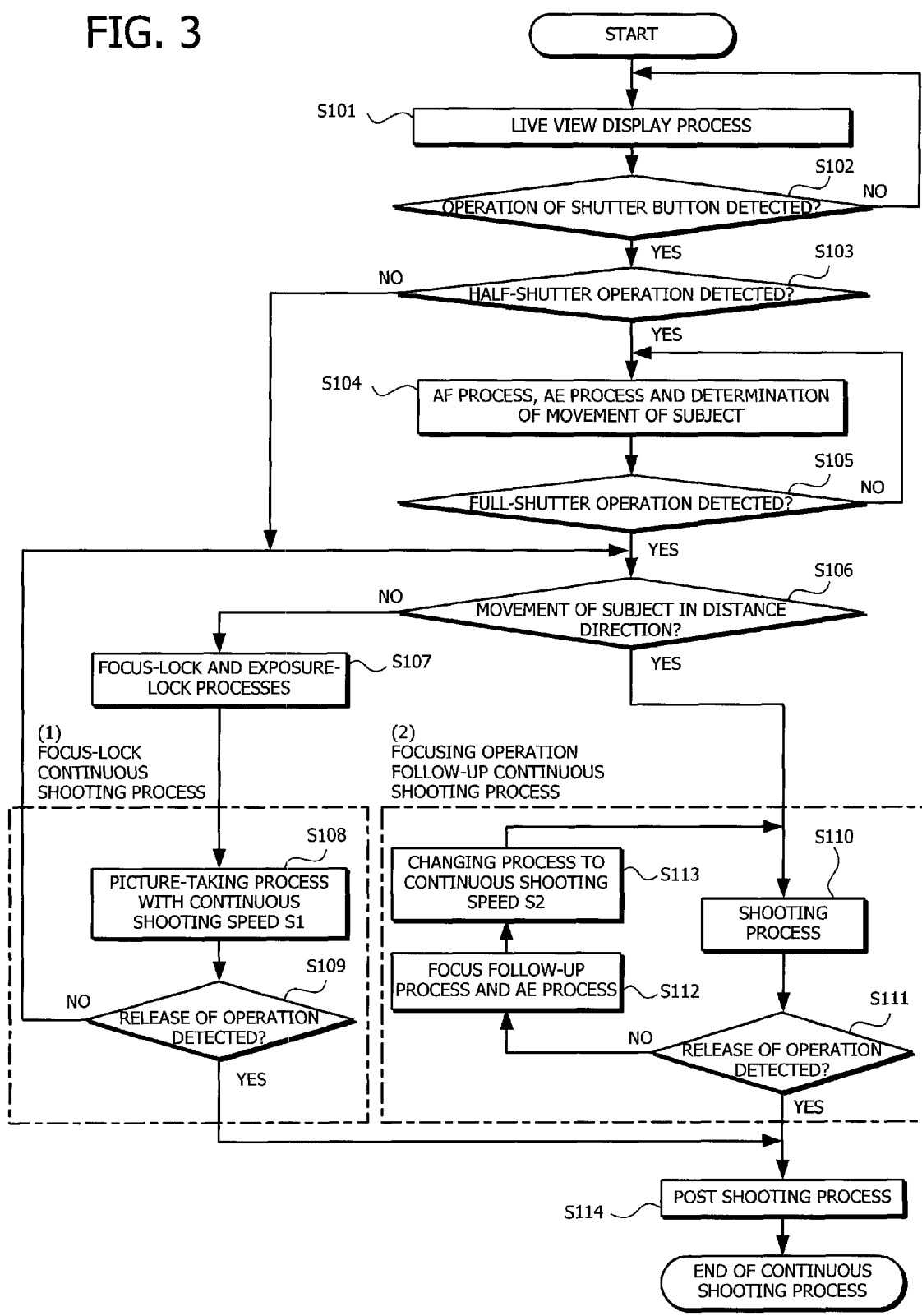
FIG. 3 is a flowchart for illustrating the processing procedure in the first embodiment.

Then, if the mode in which the movement of the subject is predicted is not set, the process of step S107 shown in FIG. 3 is performed. However, if the mode in which the movement of the subject is predicted is set, it is determined whether a continuous shooting speed preference focus-bracket picture-taking operation is previously set or not (step S203).

If the continuous shooting speed preference focus-bracket shooting operation is previously set, (3) the continuous shooting speed preference focus-bracket shooting operation is performed in the process of steps S204 to S207. That is, the continuous shooting process is started (step S204) and it is determined whether release of the full-shutter operation is detected or not (step S205). If the full-shutter operation is continuously performed, a focus lens moving process and AE process are performed (step S206).

If the subject moves in a distance direction in the focus lens moving process in step S206 (when the determination result in step S201 is YES), it is determined whether the direction corresponds to a "farther" position or "closer" position and the moving direction and moving speed of the focus lens are determined according to the thus determined direction and the movement speed of the subject.

In this case, the moving speed of the focus lens may be set slightly higher than the movement speed of the subject.

Subsequently, the continuous shooting speed is changed from the continuous shooting speed S1 to a continuous shooting speed S3 (60 (frames/sec)) (step S207) and the shooting process is continuously performed (step S204) while the focus lens is being moved in the movement direction previously determined. That is, the loop of steps S204, S205, S206, S207, and S204 is repeated if the full-shutter operation of the shutter button 4 is continuously performed.

Figure 6:
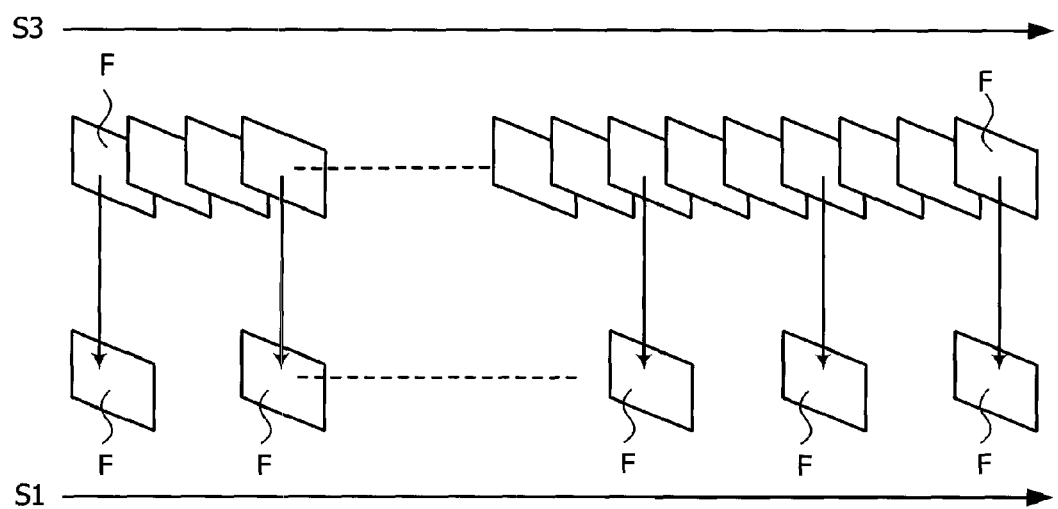
FIG. 6 is an explanatory diagrams showing the processing content of a focused image select process in the above embodiment.

Thus, as shown in FIG. 6, still images F are sequentially recorded in the work memory 13 with the number of shooting images per unit time at the continuous shooting speed S3 higher than the continuous shooting speed S1.

Then, if release of the full-shutter operation is detected in a state in which the process of the loop of step S204, S205, S206, S207, and S204 is repeatedly performed, the determination result in step S205 becomes NO.

Therefore, the process proceeds from step S205 to step S208 and a focused image select process is performed.

In the focused image select process in step S208, a plurality of still images F in which the subject is focused are selected by an image analyzing process from a plurality of still images photographed at the continuous shooting speed S3 by the process of the above loop as shown in FIG. 6. At this time, the process for selecting the plural still images F is performed with the continuous shooting period at the continuous shooting speed S1 set as a reference.

Therefore, the plural still images F in which the subject is focused are selected with the continuous shooting speed S1 set as a reference by the focused image select process in step S208.

After this, the process proceeds to step S114 in FIG. 3 to perform a post shooting process and the plural still images F selected in the work memory 13 are coded, converted into a file form, attached with a file name and stored in the storage device 14.

Therefore, in this embodiment, if the mode in which the direction of the movement of the subject is predicted is previously set when the subject does not move in the distance direction in the live view display process, (2) the focusing operation follow-up continuous shooting process is performed. Therefore, even if the subject abruptly moves in the distance direction during the continuous shooting process, it becomes possible to record images that are photographed with adequate exposure at an adequate continuous shooting speed properly set according to the movement speed of the subject while the subject is focused.

Further, successively photographed images containing images in which the subject who moves in a "departing" or "approaching" direction is focused can be recorded by performing (3) the continuous shooting speed preference focus-bracket shooting operation and focused image select process (step S208).

Further, if the determination result in step S203 is NO and a continuous shooting speed preference focus-shift continuous shooting operation is not previously set, the process after step S110 in FIG. 3 is performed.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. In this embodiment, a case wherein this invention is applied to the digital camera is explained, but this invention is not limited to this case. For example, this invention can be easily applied to a portable telephone terminal with a camera, personal digital assistant (PDA [portable information terminal]) with a camera, personal computer with a camera and the like. In short, this invention can be applied to any device that can be used to successively photograph images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging unit;
    a focusing unit configured to focus an object to be shot by the imaging unit;
    a first recording control unit configured to control the imaging unit in order to continuously record shot images at first time intervals when the object is focused by the focusing unit and a shooting instruction is detected;
    a determining unit configured to determine whether the object moves in a distance direction with respect to a shooting direction during a control operation of the first recording control unit; and
    a second recording control unit configured to perform control so as to keep a recording operation of the shot images at second time intervals while the focusing unit focuses the object when the determining unit determines that the object moves in the distance direction;
    wherein the determining unit is further configured to determine whether the object moves in a farther distance direction or a closer distance direction with respect to the shooting direction; and
    wherein the second recording control unit further comprises:
        an acquisition unit configured to continuously acquire shot images at the second time intervals while changing a focal position based on the farther distance direction or the closer distance direction determined by the determining unit; and
        a third recording control unit configured to perform control so as to select and record shot images in which the object is focused from the shot images continuously acquired by the acquisition unit;
        wherein the third recording control unit is configured to perform control so as to select and record the shot images based on the first time interval.

2. A non-transitory computer readable storage medium having a program stored thereon for controlling a computer of an apparatus having an imaging function to function as elements including:
    a first recording control unit configured to perform control so as to continuously record shot images to a recording unit at first time intervals when an object to be imaged is focused and a shooting instruction is detected;
    a determining unit configured to determine whether the object moves in a distance direction with respect to a shooting direction during a control operation of the first recording control unit; and
    a second recording control unit configured to perform control so as to keep a recording operation of the shot images at second time intervals while focusing is performed on the object when the determining unit determines that the object moves in the distance direction;

wherein the determining unit is further configured to determine whether the object moves in a farther distance direction or a closer distance direction with respect to the shooting direction; and wherein the second recording control unit further comprises:
   an acquisition unit configured to continuously acquire shot images at the second time intervals while changing a focal position based on the farther distance direction or the closer distance direction determined by the determining unit; and a third recording control unit configured to perform control so as to select and record shot images in which the object is focused from the shot images continuously acquired by the acquisition unit;

wherein the third recording control unit is configured to perform control so as to select and record the shot images based on the first time interval.

* * * * *